United States Patent
Shen et al.

(10) Patent No.: US 12,129,870 B1
(45) Date of Patent: Oct. 29, 2024

(54) ADJUSTING APPARATUS FOR IMPROVING ANTI-CAVITATION EFFECT OF WATER PUMP AND CONTROL METHOD THEREOF

(71) Applicants: Taizhou Vocational College of Science & Technology, Taizhou (CN); Wenling Fluid Machinery Technology Institute of Jiangsu University, Taizhou (CN)

(72) Inventors: Zhenhua Shen, Taizhou (CN); Chao Wang, Taizhou (CN); Jinfeng Zhang, Taizhou (CN); Yin Luo, Taizhou (CN); Xiao Jie, Taizhou (CN); Nianen Zhu, Taizhou (CN); Lijie Weng, Taizhou (CN)

(73) Assignees: Taizhou Vocational College of Science & Technology, Taizhou (CN); Wenling Fluid Machinery Technology Institute of Jiangsu University, Taizhou (CN)

( * ) Notice: Subject to any disclaimer, the term of this patent is extended or adjusted under 35 U.S.C. 154(b) by 0 days.

(21) Appl. No.: 18/432,510

(22) Filed: Feb. 5, 2024

(30) Foreign Application Priority Data

Apr. 10, 2023 (CN) .......................... 202310375195.7

(51) Int. Cl.
*F04D 27/00* (2006.01)
*F04D 1/00* (2006.01)
(Continued)

(52) U.S. Cl.
CPC ............. *F04D 29/669* (2013.01); *F04D 1/00* (2013.01); *F04D 9/06* (2013.01); *F04D 15/0005* (2013.01);
(Continued)

(58) Field of Classification Search
CPC . F04D 29/669; F04D 1/00; F04D 9/06; F04D 15/0005; F04D 27/00; F04D 29/086; F04D 29/28
See application file for complete search history.

(56) References Cited

U.S. PATENT DOCUMENTS 4,248,566 A * 2/1981 Chapman ............ F04D 27/0215
 415/26
4,287,758 A * 9/1981 Swearingen ........ F04D 29/0513
 384/307
(Continued)

FOREIGN PATENT DOCUMENTS

| CN | 209510727 U | 10/2019 |
|---|---|---|
| CN | 211398060 U | 9/2020 |
| CN | 216447187 U | 5/2022 |

*Primary Examiner* — Courtney D Heinle
*Assistant Examiner* — Andrew J Marien
(74) *Attorney, Agent, or Firm* — Nitin Kaushik

(57) ABSTRACT

The present invention discloses an adjusting apparatus for improving an anti-cavitation effect of a water pump. The adjusting apparatus comprises a centrifugal impeller (10), a volute (20), an adjusting device (30), a jet device (40), a pressure and/or flow monitoring device, and a controller. The centrifugal impeller comprises a rear side labyrinth seal (15) and a front side labyrinth seal (16), and the volute comprises a first sealing portion (21), a first pressure adjusting cavity (22), a second sealing portion (23) and a second pressure adjusting cavity (24), where the position of the first sealing portion is provided with the first pressure adjusting cavity, the position of the second sealing portion is provided with the second pressure adjusting cavity, the second pressure adjusting cavity is in communication with the first pressure adjusting cavity through the first pipeline.

5 Claims, 5 Drawing Sheets

(51) Int. Cl.
*F04D 9/06* (2006.01)
*F04D 15/00* (2006.01)
*F04D 29/08* (2006.01)
*F04D 29/28* (2006.01)
*F04D 29/66* (2006.01)

(52) U.S. Cl.
CPC ........... *F04D 27/00* (2013.01); *F04D 29/086* (2013.01); *F04D 29/28* (2013.01)

(56) References Cited

U.S. PATENT DOCUMENTS

| | | | | |
|---|---|---|---|---|
| 4,472,107 | A * | 9/1984 | Chang | F01D 3/04 415/170.1 |
| 4,884,942 | A * | 12/1989 | Pennink | F16C 39/04 415/107 |
| 6,036,434 | A * | 3/2000 | Ray | F04D 29/2266 261/DIG. 71 |
| 7,775,763 | B1 * | 8/2010 | Johnson | F04D 29/2266 415/111 |
| 11,268,523 | B2 * | 3/2022 | Goldenberg | F04D 29/442 |
| 2010/0119367 | A1 * | 5/2010 | Nakaniwa | F04D 29/669 415/230 |
| 2013/0318797 | A1 * | 12/2013 | Royal | F04D 27/02 29/898.041 |
| 2014/0056696 | A1 * | 2/2014 | Kawano | F04D 29/688 415/144 |

\* cited by examiner

--Prior Art--

--Prior Art--

ADJUSTING APPARATUS FOR IMPROVING ANTI-CAVITATION EFFECT OF WATER PUMP AND CONTROL METHOD THEREOF

CROSS-REFERENCE TO RELATED APPLICATIONS

The application claims priority to Chinese patent application No. 202310375195.7, filed on Apr. 10, 2023, the entire contents of which are incorporated herein by reference.

TECHNICAL FIELD

The present invention relates to the technical field of water pumps, and in particular, to an adjusting apparatus for improving an anti-cavitation effect of a water pump and a control method thereof.

BACKGROUND

As shown in FIG. 1 and FIG. 2, in order to improve an anti-cavitation effect of a water pump, guiding high-pressure water at the back pressure side of the water pump or a pumping chamber to an inlet of an impeller through a pipeline is an adjusting means commonly used in the art. However, an existing adjusting apparatus still has problems of narrow adjusting range, lower anti-cavitation efficiency and poor anti-cavitation effect.

SUMMARY

An objective of the present invention is to provide an adjusting apparatus for improving an anti-cavitation effect of a water pump and a control method thereof to overcome shortcomings in the prior art. According to the adjusting apparatus, by means of a design of a first pressure adjusting cavity and a second pressure adjusting cavity, a liquid jet with a higher pressure and more stable pressure is provided for a jet device. The liquid jet is sprayed to an inlet and a front edge of a blade that are of a centrifugal impeller, thereby improving the anti-cavitation effect of the water pump. The anti-cavitation effect is more efficient and more stable. According to the adjusting apparatus, by means of a design of an adjusting device and a jet device, the adjusting device can adjust an anti-cavitation effect corresponding to a plurality of operating conditions. Compared with an adjusting apparatus in the prior art, the adjusting range is wider, and the anti-cavitation effect is more efficient and more stable.

In order to realize the purposes mentioned above, the present invention adopts the following technical solution:

an adjusting apparatus for improving an anti-cavitation effect of a water pump, comprising a centrifugal impeller (10), a volute (20), an adjusting device (30), a jet device (40), a pressure and/or flow monitoring device, and a controller, where the centrifugal impeller is mounted in the volute, the centrifugal impeller comprises a front disc (11), a rear disc (12), blades (13), a rotating shaft (14), a rear side labyrinth seal (15), and a front side labyrinth seal (16), a plurality of blades are distributed in a circumferential direction and are connected between the front disc and the rear disc, a middle position of the rear disc is provided with the rotating shaft, the rotating shaft is connected to a motor through a bearing box and a coupling, an outer side of the rear disc is provided with a rear side labyrinth seal, and an outer side of the front disc is provided with a front side labyrinth seal: the volute comprises a first sealing portion (21), a first pressure adjusting cavity (22), a second sealing portion (23), and a second pressure adjusting cavity (24), the position of the first sealing portion corresponds to the rear side labyrinth seal and constitutes a labyrinth seal, the position of the second sealing portion corresponds to the front side labyrinth seal and constitutes a labyrinth seal, and the pressure and/or flow monitoring device is used for monitoring pressure and/or flow at an inlet and an outlet of the water pump, where the position of the first sealing portion is provided with the first pressure adjusting cavity, the first pressure adjusting cavity has a first pressure, and the first pressure adjusting cavity is in communication with a rear side cavity of the rear disc through a sealing cavity, the position of the second sealing portion is provided with the second pressure adjusting cavity, the second pressure adjusting cavity has a second pressure, and the second pressure adjusting cavity is in communication with a front side cavity of the front disc through a sealing cavity; and the adjusting device comprises a first pipeline (31), the second pressure adjusting cavity is in communication with the first pressure adjusting cavity through the first pipeline, the jet device is mounted in an inlet pipe of the volute, the jet device is in communication with the second pressure adjusting cavity, and a cross sectional area of the first pressure adjusting cavity (22) is greater than a cross sectional area of the second pressure adjusting cavity (24).

Further, the first pressure adjusting cavity (22) has a radius R1, the second pressure adjusting cavity (24) has a radius R2, and R1 is 1.3 to 2 times of R2.

Further, the adjusting device (30) comprises a first pipeline (31), a second pipeline (32), a third pipeline (33), a first regulation and control valve (34), a second regulation and control valve (35), and a third regulation and control valve (36), the first pipeline is provided with the first regulation and control valve, a first through-hole (25) is formed on a front side wall of the volute (20) at a position corresponding to the front disc (11), a second through-hole is formed on a pumping chamber of the volute, the pumping chamber is located on a radial outer side of the centrifugal impeller, two ends of the second pipeline are respectively in communication with the second through-hole and the first through-hole, two ends of the third pipeline are respectively in communication with the first pipeline and the first through-hole, the third pipeline is provided with the second regulation and control valve, an upstream end of the third pipeline 33 is connected between the first regulation and control valve and the second pressure adjusting cavity, and the second pipeline is provided with the third regulation and control valve.

Further, a backflow hole (17) is formed on the front disc (11), the position of the backflow hole corresponds to the position of the first through-hole (25), and the quantity of the backflow holes is one or more which are distributed in a circumferential direction.

Further, in a first operating condition, only the first regulation and control valve (34) is opened, and a high-pressure liquid in the first pressure adjusting cavity (22) passes through the first pipeline (31), the second pressure adjusting cavity (24), and the jet device (40) to be sprayed to an inlet and a front edge of a blade (13) that are of the centrifugal impeller (10), thereby adjusting flow; pressure, and inlet turbulence that are of the water pump, and improving the anti-cavitation effect or inhibiting cavitation of the water pump; and in a second operating condition, only the third regulation and control valve (36) is opened, and a high-pressure liquid in the pumping chamber of the volute (20) passes through the second pipeline (32) and the first through-hole (25) to be sprayed to the backflow hole (17) on the front disc (11), thereby adjusting flow, pressure, and backflow of a front disc side that are of the water pump, and improving the anti-cavitation effect or inhibiting cavitation 20) of the water pump.

Further, in a third operating condition, the first regulation and control valve (34) is opened, and the second regulation and control valve (35) or the third regulation and control valve (36) is opened, to realize two-way spraying of jet, thereby adjusting flow, pressure, inlet turbulence and backflow of a front disc side that are of the water pump, and improving the anti-cavitation effect or inhibiting cavitation of the water pump; and in a fourth operating condition, the first regulation and control valve (34) is opened, and the second regulation and control valve (35) and the third regulation and control valve (36) are both opened, to realize three-way supply and two-way spraying of jet, thereby adjusting flow, pressure, inlet turbulence and backflow of a front disc side that are of the water pump, and improving the anti-cavitation effect or inhibiting cavitation of the water pump.

Further, the jet device (40) comprises an arc-shaped jet head (41), a rotating drum (42), a driver (43), a liquid inlet hole (44), and a jet orifice (45), an upper end of the arc-shaped jet head is provided with the rotating drum, an arc-shaped inner cavity is disposed in the arc-shaped jet head, the rotating drum has a hollow inner cavity, the hollow inner cavity is in communication with the arc-shaped inner cavity, a liquid inlet hole is formed in a peripheral side wall of the rotating drum, the hollow inner cavity of the rotating drum is in communication with the second pressure adjusting cavity (24) through the liquid inlet hole, a part of the rotating drum is located in the sealing cavity, and the rotating drum is disposed between the second pressure adjusting cavity and the front side labyrinth seal (16), the driver is mounted on an outer wall of the inlet pipe of the volute, an output shaft of the driver is connected to the rotating drum, the driver is a motor or a rotating cylinder, the jet orifice is formed at a downstream end of the arc-shaped jet head, the jet orifice is a rectangular through-hole or a circular through-hole, and one or more jet orifices are arranged in a radial direction.

A control method of an adjusting apparatus for improving an anti-cavitation effect of a water pump comprises the following steps:

step S1: pressure and/or flow at an inlet and an outlet of the water pump is monitored through a pressure and/or flow monitoring device, a monitoring result is compared to a preset result and analyzed, and a controller matches a corresponding operating condition mode according to an analysis result;

step S2: in a first operating condition, only the first regulation and control valve (34) is opened, and a high-pressure liquid in the first pressure adjusting cavity (22) passes through the first pipeline (31), the second pressure adjusting cavity (24), and the jet device (40) to be sprayed to an inlet and a front edge of the blade that are of the centrifugal impeller, thereby adjusting flow, pressure, and inlet turbulence that are of the water pump, and improving the anti-cavitation effect or inhibiting cavitation of the water pump;

in a second operating condition, only the third regulation and control valve (36) is opened, and a high-pressure liquid in the pumping chamber of the volute (20) passes through the second pipeline (32) and the first through-hole (25) to be sprayed to the backflow hole (17) on the front disc (11), thereby adjusting flow, pressure, and backflow of a front disc side that are of the water pump, and improving the anti-cavitation effect or inhibiting cavitation of the water pump;

in a third operating condition, the first regulation and control valve (34) is opened, and the second regulation and control valve (35) or the third regulation and control valve (36) is opened, to realize two-way spraying of jet, thereby adjusting flow, pressure, inlet turbulence and backflow of a front disc side that are of the water pump, and improving the anti-cavitation effect or inhibiting cavitation of the water pump; and in a fourth operating condition, the first regulation and control valve (34) is opened, and the second regulation and control valve (35) and the third regulation and control valve (36) are both opened, to realize three-way supply and two-way spraying of jet, thereby adjusting flow, pressure, inlet turbulence and backflow of a front disc side that are of the water pump, and improving the anti-cavitation effect or inhibiting cavitation of the water pump; and step S3: the controller outputs an operating state of the water pump according to an adjusting result.

According to the adjusting apparatus for improving an anti-cavitation effect of a water pump and a control method thereof provided in the present invention, by means of a design of the first pressure adjusting cavity and the second pressure adjusting cavity, a liquid jet with a higher pressure and more stable pressure is provided for the jet device. The liquid jet is sprayed to the inlet and the front edge of a blade that are of the centrifugal impeller, thereby improving the anti-cavitation effect of the water pump. Compared with an adjusting apparatus in the prior art, the anti-cavitation effect is more efficient and more stable.

According to the adjusting apparatus for improving an anti-cavitation effect of a water pump and a control method thereof provided in the present invention, by means of a design of the adjusting device and the jet device, the adjusting device can adjust an anti-cavitation effect corresponding to a plurality of operating conditions. Compared with an adjusting apparatus in the prior art, the adjusting range is wider, and the anti-cavitation effect is more efficient and more stable. The driver is used for driving the arc-shaped jet head to rotate by a certain angle, to change a jet direction of the jet orifice, so that positions of the liquid jet sprayed to the inlet and the front edge of a blade that are of the centrifugal impeller can be adjusted according to different operating conditions.

Figure 1:
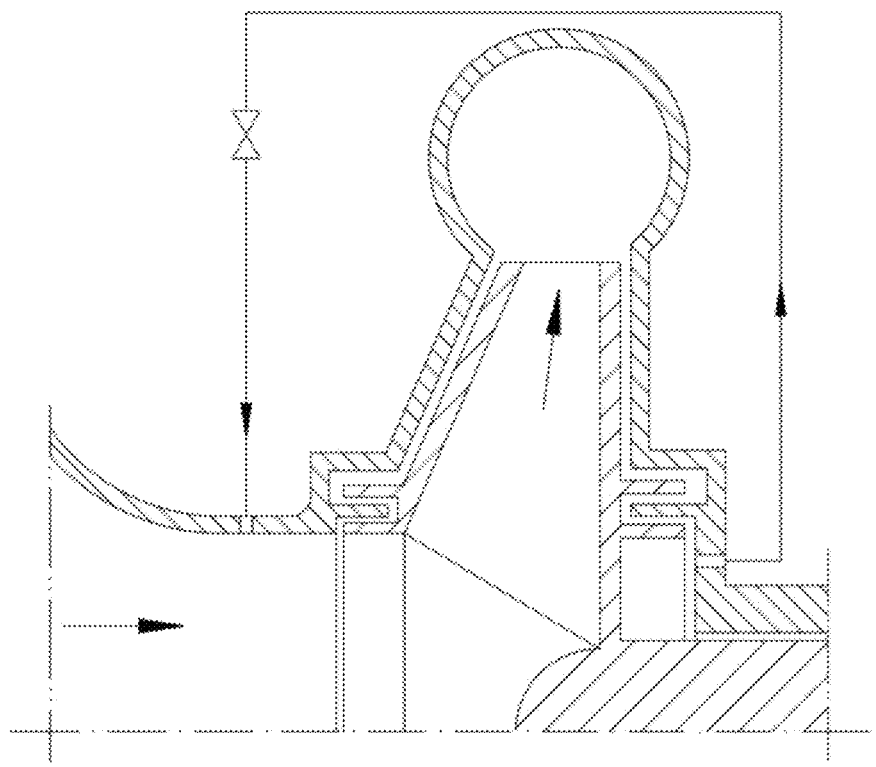
FIG. 1 is a schematic structural diagram of an adjusting apparatus of a water pump in the prior art.

In the drawings: centrifugal impeller 10, front disc 11, rear disc 12, blade 13, rotating shaft/rotating hub 14, rear side labyrinth seal 15, front side labyrinth seal 16, backflow hole 17; volute 20, first sealing portion 21, first pressure adjusting cavity/pressure storage cavity 22, second sealing portion 23, second pressure adjusting cavity 24, first through-hole 25; adjusting device 30, first pipeline 31, second pipeline 32, third pipeline 33, first regulation and control valve 34, second regulation and control valve 35, third regulation and control valve 36; jet device 40, arc-shaped jet head 41, rotating drum 42, driver 43, liquid inlet hole 44, jet orifice 45; rear side cavity of the rear disc 51, front side cavity of the front disc 52, pressure and/or flow monitoring device 53, controller 54; arrow "→" fluid flow direction.

DETAILED DESCRIPTION OF THE EMBODIMENTS

To make the purposes, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following describes the present invention in detail with reference to the accompanying drawings.

Figure 3:
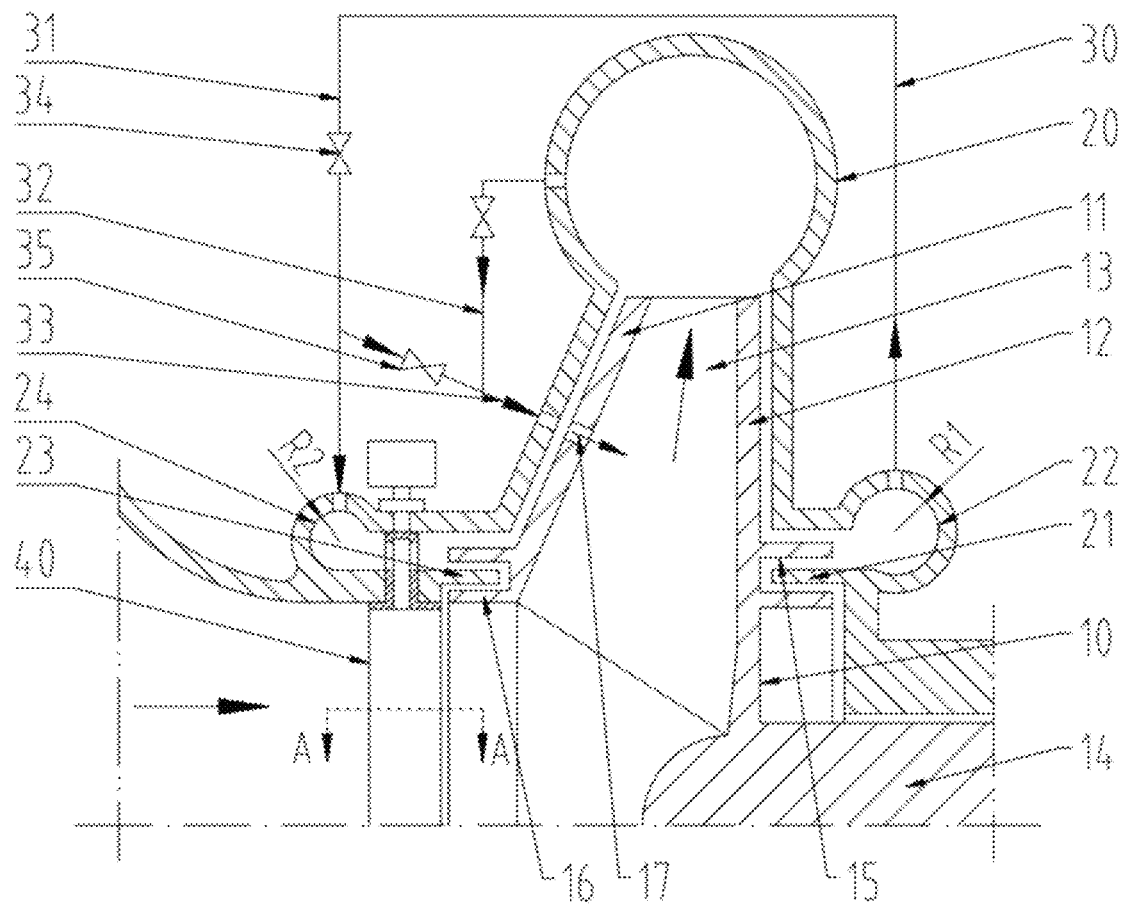
FIG. 3 is a schematic structural diagram of an adjusting apparatus for improving an anti-cavitation effect of a water pump according to the present invention.
Figure 4:
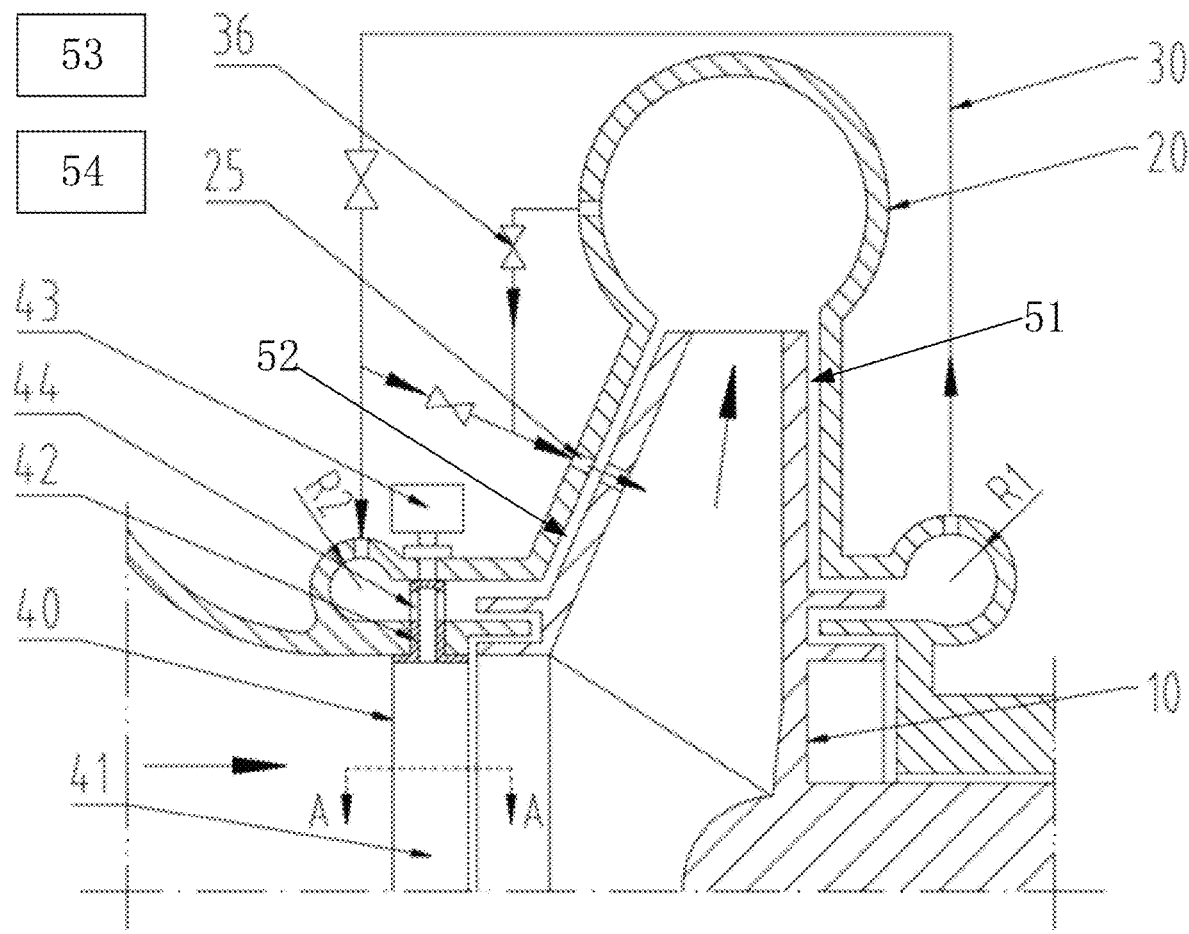
FIG. 4 is a schematic structural diagram of an adjusting apparatus for improving an anti-cavitation effect of a water pump according to the present invention.
Figure 5:
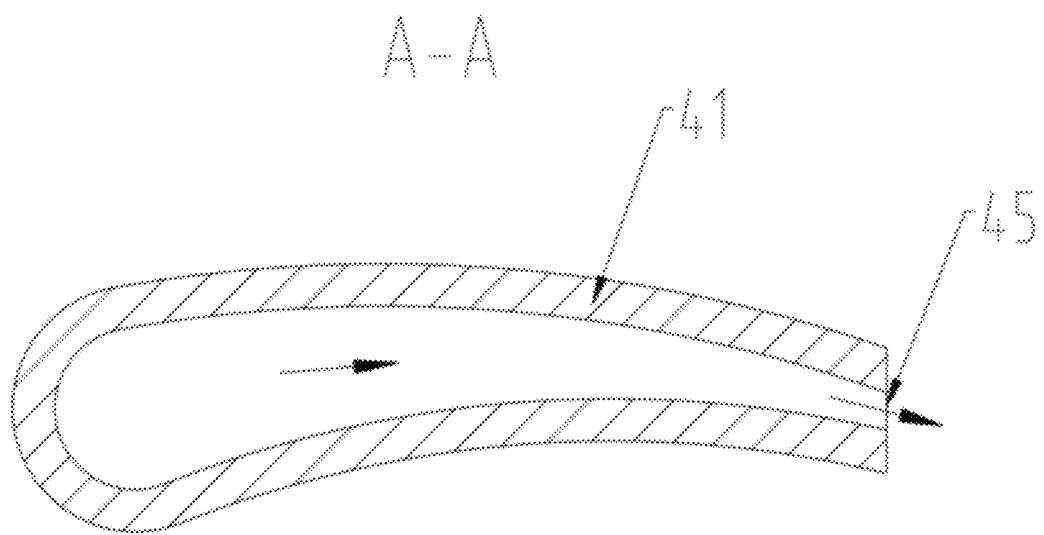
FIG. 5 is a schematic structural diagram of a jet device according to the present invention.

As shown in FIG. 3 to FIG. 5, an adjusting apparatus for improving an anti-cavitation effect of a water pump, comprising a centrifugal impeller 10, a volute 20, an adjusting device 30, a jet device 40, a pressure and/or flow monitoring device, and a controller, where the centrifugal impeller 10 is mounted in the volute 20, the centrifugal impeller 10 comprises a front disc 11, a rear disc 12, blades 13, a rotating shaft/rotating hub 14, a rear side labyrinth seal 15, and a front side labyrinth seal 16, a plurality of blades 13 are distributed in a circumferential direction and are connected between the front disc 11 and the rear disc 12, a middle position of the rear disc 12 is provided with the rotating shaft 14, the rotating shaft 14 is connected to a motor through a bearing box and a coupling, an outer side of the rear disc 12 is provided with the rear side labyrinth seal 15, and an outer side of the front 20) disc 11 is provided with the front side labyrinth seal 16; the volute 20 comprises a first sealing portion 21, a first pressure adjusting cavity/pressure storage cavity 22, a second sealing portion 23, and a second pressure adjusting cavity 24, the position of the first sealing portion 21 corresponds to the rear side labyrinth seal 15 and constitutes a labyrinth seal, the position of the second sealing portion 23 corresponds to the front side labyrinth seal 16 and constitutes a labyrinth seal, and a pressure and/or flow monitoring device is used for monitoring pressure and/or flow at an inlet and an outlet of the water pump, where the position of the first sealing portion 21 is provided with the first pressure adjusting cavity 22, the first pressure adjusting cavity 22 has a first pressure, and the first pressure adjusting cavity 22 is in communication with a rear side cavity of the rear disc 12 through a sealing cavity, the position of the second sealing portion 23 is provided with the second pressure adjusting cavity 24, the second pressure adjusting cavity 24 has a second pressure, and the second pressure adjusting cavity 24 is in communication with a front side cavity of the front disc 11 through a sealing cavity; and the adjusting device 30 comprises a first pipeline 31, the second pressure adjusting cavity 24 is in communication with the first pressure adjusting cavity 22 through the first pipeline 31, the jet device 40 is mounted in an inlet pipe of the volute 20, the jet device 40 is in communication with the second pressure adjusting cavity 24, and a cross sectional area of the first pressure adjusting cavity 22 is greater than a cross sectional area of the second pressure adjusting cavity 24.

The first pressure adjusting cavity 22 has a radius R1, the second pressure adjusting cavity 24 has a radius R2, and R1 is 1.3 to 2 times of R2, preferably, 1.5 to 1.6 times.

Figure 2:
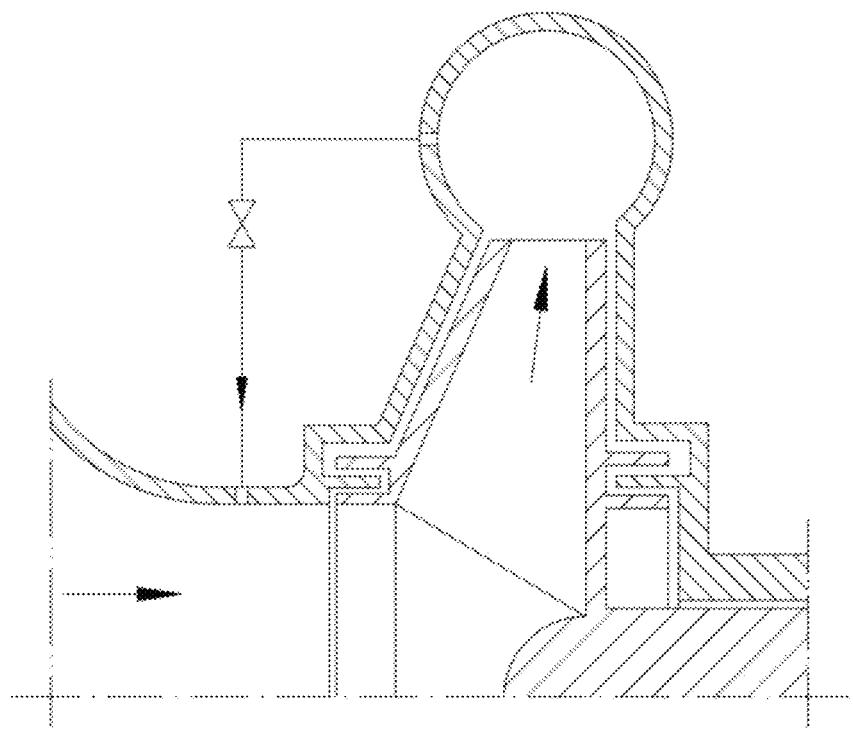
FIG. 2 is a schematic structural diagram of an adjusting apparatus of a water pump in the prior art.

By means of a design of the first pressure adjusting cavity 22 and the second pressure adjusting cavity 24 of the present invention, the position of the first sealing portion 21 is provided with the first pressure adjusting cavity 22, and the first pressure adjusting cavity 22 is in communication with a rear side cavity of the rear disc 12 through a sealing cavity: the position of the second sealing portion 23 is provided with the second pressure adjusting cavity 24, and the second pressure adjusting cavity 24 is in communication with a front side cavity of the front disc 11 through a sealing cavity; and the second pressure adjusting cavity 24 is in communication with the first pressure adjusting cavity 22 through the first pipeline 31, the jet device 40 is in communication with the second pressure adjusting cavity 24, and a cross sectional area of the first pressure adjusting cavity 22 is greater than a cross sectional area of the second pressure adjusting cavity 24. Since pressures at the labyrinth seals are more stable than the pressure at other locations, and the pressure of the first pressure adjusting cavity 22 is higher than the pressure of the second pressure adjusting cavity 24, liquid introduced from the first pressure adjusting cavity 22 on the back side of the impeller passes through the second pressure adjusting cavity 24 to be supplied to the jet device 40, so that a liquid jet with a higher pressure and more stable pressure is provided for the jet device 40. The liquid jet is sprayed to an inlet and a front edge of a blade 13 that are of the centrifugal impeller 10, thereby 20) improving the anti-cavitation effect of the water pump. Compared with an adjusting apparatus in the prior art (as shown in FIG. 1 and FIG. 2), the anti-cavitation effect is more efficient and more stable. In addition, axial force can be balanced.

The adjusting device 30 comprises a first pipeline 31, a second pipeline 32, a third pipeline 33, a first regulation and control valve 34, a second regulation and control valve 35, and a third regulation and control valve 36, the first pipeline 31 is provided with the first regulation and control valve 34, a first through-hole 25 is formed on a front side wall of the volute 20 at a position corresponding to the front disc 11, a second through-hole is formed on a pumping chamber of the volute 20, the pumping chamber is located on a radial outer side of the centrifugal impeller 10, two ends of the second pipeline 32 are respectively in communication with the second through-hole and the first through-hole 25, two ends of the third pipeline 33 are respectively in communication with the first pipeline 31 and the first through-hole, the third pipeline 33 is provided with the second regulation and control valve 35, an upstream end of the third pipeline 33 is connected between the first regulation and control valve 34 and the second pressure adjusting cavity 24, and the second pipeline 32 is provided with the third regulation and control valve 36.

A backflow hole 17 is formed on the front disc 11, the position of the backflow hole 17 corresponds to the position of the first through-hole 25, and the quantity of the backflow holes 17 is one or more which are distributed in a circumferential direction.

In a first operating condition, only the first regulation and control valve 34 is opened, and a high-pressure liquid in the first pressure adjusting cavity 22 passes through the first pipeline 31, the second pressure adjusting cavity 24, and the jet device 40 to be sprayed to an inlet and a front edge of a blade 13 that are of the centrifugal impeller 10, thereby adjusting flow, pressure, and inlet turbulence that are of the water pump, and improving the anti-cavitation effect or inhibiting cavitation of the water pump.

In a second operating condition, only the third regulation and control valve 36 is opened, and a high-pressure liquid in the pumping chamber of the volute 20 passes through the second pipeline 32 and the first through-hole 25 to be sprayed to the backflow hole 17 on the front disc 11, thereby adjusting flow, pressure, and backflow of a front disc side that are of the water pump, and improving the anti-cavitation effect or inhibiting cavitation of the water pump.

In a third operating condition, the first regulation and control valve 34 is opened, and the second regulation and control valve 35 or the third regulation and control valve 36 is opened, to realize two-way spraying of jet, thereby adjusting flow, pressure, inlet turbulence and backflow of a front disc side that are of the water pump, and improving the anti-cavitation effect or inhibiting cavitation of the water pump.

In a fourth operating condition, the first regulation and control valve 34 is opened, and the second regulation and control valve 35 and the third regulation and control valve 36 are both opened, to realize three-way supply and two-way spraying of jet, thereby adjusting flow, pressure, inlet turbulence and backflow of a front disc side that are of the water pump, and improving the anti-cavitation effect or inhibiting cavitation of the water pump.

The jet device 40 comprises an arc-shaped jet head 41, a rotating drum 42, a driver 43, a liquid inlet hole 44, and a jet orifice 45, an upper end of the arc-shaped jet head 41 is provided with the rotating drum 42, an arc-shaped inner cavity is disposed in the arc-shaped jet head 41, the rotating drum 42 has a hollow inner cavity, the hollow inner cavity is in communication with the arc-shaped inner cavity, the liquid inlet hole 44 is formed in a peripheral side wall of the rotating drum 42, the hollow inner cavity of the rotating drum 42 is in communication with the second pressure adjusting cavity 24 through the liquid inlet hole 44, a part of the rotating drum 42 is located in the sealing cavity, and the rotating drum 42 is disposed between the second pressure adjusting cavity 24 and the front side labyrinth seal 16, the driver 43 is mounted on an outer wall of the inlet pipe of the volute 20, an output shaft of the driver 43 is connected to the rotating drum 42, the driver 43 is a motor or a rotating cylinder, the jet orifice 45 is formed at a downstream end of the arc-shaped jet head 41, the jet orifice 45 is a rectangular through-hole or a circular through-hole, and one or more jet orifices 45 are arranged in a radial direction.

The driver 43 is used for driving the arc-shaped jet head 41 to rotate by a certain angle, to change a jet direction of the jet orifice 45, so that positions of the liquid jet sprayed to the inlet and the front edge of a blade 13 that are of the centrifugal impeller 10 can be adjusted according to different operating conditions (such as first to fourth operating conditions).

In FIG. 1 to FIG. 5, arrows "→, ←, ↑, ↓" indicate a liquid flow direction.

According to the adjusting apparatus for improving an anti-cavitation effect of a water pump provided in the present invention, by means of a design of the adjusting device 30 and the jet device 40, the adjusting device 30 can adjust an anti-cavitation effect corresponding to a plurality of operating conditions. Compared with an adjusting apparatus in the prior art (as shown in FIG. 1 and FIG. 2), the adjusting range is wider, and the anti-cavitation effect is more efficient and more stable. The driver 43 is used for driving the arc-shaped jet head 41 to rotate by a certain angle, to change a jet direction of the jet orifice 45, so that positions of the liquid jet sprayed to the inlet and the front edge of a blade 13 that are of the centrifugal impeller 10 can be adjusted according to different operating conditions (such as first to fourth operating conditions, or more operating conditions). In addition, axial force can be balanced.

A control method of an adjusting apparatus for improving an anti-cavitation effect of a water pump comprises the following steps:

step S1: pressure and/or flow at an inlet and an outlet of the water pump is monitored through a pressure and/or flow monitoring device, a monitoring result is compared to a preset result and analyzed, and a controller matches a corresponding operating condition mode according to an analysis result;

step S2: in a first operating condition, only the first regulation and control valve 34 is opened, and a high-pressure liquid in the first pressure adjusting cavity 22 passes through the first pipeline 31, the second pressure adjusting cavity 24, and the jet device 40 to be sprayed to an inlet and a front edge of a blade 13 that are of the centrifugal impeller 10, thereby adjusting flow, pressure, and inlet turbulence that are of the water pump, and improving the anti-cavitation effect or inhibiting cavitation of the water pump;

in a second operating condition, only the third regulation and control valve 36 is opened, and a high-pressure liquid in a pumping chamber of the volute 20 passes through the second pipeline 32 and the first through-hole 25 to be sprayed to the backflow hole 17 on the front disc 11, thereby adjusting flow, pressure, and backflow of a front disc side that are of the water pump, and improving the anti-cavitation effect or inhibiting cavitation of the water pump;

in a third operating condition, the first regulation and control valve 34 is opened, and the second regulation and control valve 35 or the third regulation and control valve 36 is opened, to realize two-way spraying of jet, thereby adjusting flow, pressure, inlet turbulence and backflow of a front disc side that are of the water pump, and improving the anti-cavitation effect or inhibiting cavitation of the water pump; and in a fourth operating condition, the first regulation and control valve 34 is opened, and the second regulation and control valve 35 and the third regulation and control valve 36 are both opened, to realize three-way supply and two-way spraying of jet, thereby adjusting flow, pressure, inlet turbulence and backflow of a front disc side that are of the water pump, and improving the anti-cavitation effect or inhibiting cavitation of the water pump; and step S3: the controller outputs an operating state of the water pump according to an adjusting result, such as normal or abnormal, etc.

According to the adjusting apparatus for improving an anti-cavitation effect of a water pump and a control method thereof provided in the present invention, by means of a design of the first pressure adjusting cavity 22 and the second pressure adjusting cavity 24, a liquid jet with a higher pressure and more stable pressure is provided for the jet device 40. The liquid jet is sprayed to the inlet and the front edge of a blade 13 that are of the centrifugal impeller 10, thereby improving the anti-cavitation effect of the water pump. Compared with an adjusting apparatus in the prior art (as shown in FIG. 1 and FIG. 2), the anti-cavitation effect is more efficient and more stable.

According to the adjusting apparatus for improving an anti-cavitation effect of a water pump 20) and a control method thereof provided in the present invention, by means of a design of the adjusting device 30 and the jet device 40, the adjusting device 30 can adjust an anti-cavitation effect corresponding to a plurality of operating conditions. Compared with an adjusting apparatus in the prior art (as shown in FIG. 1 and FIG. 2), the adjusting range is wider, and the anti-cavitation effect is more efficient and more stable. The driver 43 is used for driving the arc-shaped jet head 41 to rotate by a certain angle, to change a jet direction of the jet orifice 45, so that positions of the liquid jet sprayed to the inlet and the front edge of a blade 13 that are of the centrifugal impeller 10 can be adjusted according to different operating conditions (such as first to fourth operating conditions, or more operating conditions). In addition, axial force can be balanced.

It should be noted that all the directional indications (such as up, down, left, right, front, back, horizontal, vertical, and the like) in the embodiments of the present invention are merely used to explain a relative position relationship, a motion situation, and the like of each component in a specific gesture (as shown in the drawings). If the specific gesture changes, the directional indication changes accordingly, and the "connected" may be directly connected, or may be indirectly connected, and the "disposed", "disposed on", and "disposed at" may be directly disposed, or may be indirectly disposed.

The foregoing embodiments are a description of the present invention, and are not intended to limit the present invention. It should be understood that various changes, modifications, replacements and variations can be made to these embodiments without departing from the principle and spirit of the present invention. The scope of protection of the present invention is limited by the appended claims and equivalents thereof.

What is claimed is:

1. An adjusting apparatus for improving an anti-cavitation effect of a water pump, comprising a centrifugal impeller (10), a volute (20), an adjusting device (30), a jet device (40), a pressure and/or flow monitoring device (53), and a controller (54), wherein the centrifugal impeller is mounted in the volute, the centrifugal impeller comprises a front disc (11), a rear disc (12), blades (13), a rotating shaft (14), a rear side labyrinth seal (15), and a front side labyrinth seal (16), the blades (13) are distributed in a circumferential direction and are connected between the front disc and the rear disc, a middle position of the rear disc is provided with the rotating shaft, the rotating shaft is connected to a motor through a bearing box and a coupling, an outer side of the rear disc is provided with the rear side labyrinth seal (15), and an outer side of the front disc is provided with the front side labyrinth seal (16); the volute comprises a first sealing portion (21), a first pressure adjusting cavity (22), a second sealing portion (23), and a second pressure adjusting cavity (24), a position of the first sealing portion corresponds to the rear side labyrinth seal and constitutes a first labyrinth seal, a position of the second sealing portion corresponds to the front side labyrinth seal and constitutes a second labyrinth seal, and the pressure and/or flow monitoring device is used for monitoring pressure and/or flow at an inlet and an outlet of the water pump, wherein the position of the first sealing portion is provided with the first pressure adjusting cavity, the first pressure adjusting cavity has a first pressure, and the first pressure adjusting cavity is in communication with a rear side cavity of the rear disc (51) through the first labyrinth seal, the position of the second sealing portion is provided with the second pressure adjusting cavity, the second pressure adjusting cavity has a second pressure, and the second pressure adjusting cavity is in communication with a front side cavity of the front disc (52) through the second labyrinth seal; and the adjusting device comprises a first pipeline (31), the second pressure adjusting cavity is in communication with the first pressure adjusting cavity through the first pipeline, the jet device is mounted in an inlet pipe of the volute, the jet device is in communication with the second pressure adjusting cavity, and a cross sectional area of the first pressure adjusting cavity (22) is greater than a cross sectional area of the second pressure adjusting cavity (24); wherein the first pressure adjusting cavity (22) has a radius R1, the second pressure adjusting cavity (24) has a radius R2, and R1 is 1.3 to 2 times of R2;

the adjusting device (30) comprises the first pipeline (31), a second pipeline (32), a third pipeline (33), a first regulation and control valve (34), a second regulation and control valve (35), and a third regulation and control valve (36), the first pipeline is provided with the first regulation and control valve, a first through-hole (25) is formed on a front side wall of the volute (20) at a position corresponding to the front disc (11), a second through-hole is formed on a pumping chamber of the volute, the pumping chamber is located on a radial outer side of the centrifugal impeller, two ends of the second pipeline are respectively in communication with the second through-hole and the first through-hole, two ends of the third pipeline are respectively in communication with the first pipeline and the first through-hole, the third pipeline is provided with the second regulation and control valve, an upstream end of the third pipeline (33) is connected between the first regulation and control valve and the second pressure adjusting cavity, and the second pipeline is provided with the third regulation and control valve;

and a backflow hole (17) is formed on the front disc (11), a position of the backflow hole corresponds to the position of the first through-hole (25), and the quantity of the backflow holes is one or more which are distributed in the circumferential direction.

2. The adjusting apparatus for improving the anti-cavitation effect of the water pump according to claim 1, wherein in a first operating condition, only the first regulation and control valve (34) is opened, and a high-pressure liquid in the first pressure adjusting cavity (22) passes through the first pipeline (31), the second pressure adjusting cavity (24), and the jet device (40) to be sprayed to the inlet and a front edge of the blade (13) that are of the centrifugal impeller (10), thereby adjusting flow, pressure, and inlet turbulence that are of the water pump, and improving the anti-cavitation effect or inhibiting cavitation of the water pump; and in a second operating condition, only the third regulation and control valve (36) is opened, and a high-pressure liquid in the pumping chamber of the volute (20) passes through the second pipeline (32) and the first through-hole (25) to be sprayed to the backflow hole (17) on the front disc (11), thereby adjusting flow, pressure, and backflow of a front disc side that are of the water pump, and improving the anti-cavitation effect or inhibiting cavitation of the water pump.

3. The adjusting apparatus for improving the anti-cavitation effect of the water pump according to claim 1, wherein in a third operating condition, the first regulation and control valve (34) is opened, and the second regulation and control valve (35) or the third regulation and control valve (36) is opened, to realize two-way spraying of jet, thereby adjusting flow, pressure, inlet turbulence and backflow of a front disc side that are of the water pump, and improving the anti-cavitation effect or inhibiting cavitation of the water pump; and in a fourth operating condition, the first regulation and control valve (34) is opened, and the second regulation and control valve (35) and the third regulation and control valve (36) are both opened, to realize three-way supply and two-way spraying of jet, thereby adjusting flow, pressure, inlet turbulence and backflow of the front disc side that are of the water pump, and improving the anti-cavitation effect or inhibiting cavitation of the water pump.

4. The adjusting apparatus for improving the anti-cavitation effect of the water pump according to claim 1, wherein the jet device (40) comprises an arc-shaped jet head (41), a rotating drum (42), a driver (43), a liquid inlet hole (44), and a jet orifice (45), an upper end of the arc-shaped jet head is provided with the rotating drum, an arc-shaped inner cavity is disposed in the arc-shaped jet head, the rotating drum has a hollow inner cavity, the hollow inner cavity is in communication with the arc-shaped inner cavity, a liquid inlet hole is formed in a peripheral side wall of the rotating drum, the hollow inner cavity of the rotating drum is in communication with the second pressure adjusting cavity (24) through the liquid inlet hole, a part of the rotating drum is located in the sealing cavity, and the rotating drum is disposed between the second pressure adjusting cavity and the front side labyrinth seal (16), the driver is mounted on an outer wall of the inlet pipe of the volute, an output shaft of the driver is connected to the rotating drum, the driver is a motor or a rotating cylinder, the jet orifice is formed at a downstream end of the arc-shaped jet head, the jet orifice is a rectangular through-hole or a circular through-hole, and one or more jet orifices are arranged in a radial direction.

5. A control method of the adjusting apparatus for improving the anti-cavitation effect of the water pump, comprising the adjusting apparatus for improving the anti-cavitation effect of the water pump according to claim 1, and comprising the following steps:

step S1: pressure and/or flow at the inlet and the outlet of the water pump is monitored through the pressure and/or flow monitoring device, a monitoring result is compared to a preset result and analyzed, and the controller matches a corresponding operating condition mode according to an analysis result;

step S2: in a first operating condition, only the first regulation and control valve (34) is opened, and a high-pressure liquid in the first pressure adjusting cavity (22) passes through the first pipeline (31), the second pressure adjusting cavity (24), and the jet device (40) to be sprayed to the inlet and a front edge of the blades that are of the centrifugal impeller, thereby adjusting flow, pressure, and inlet turbulence that are of the water pump, and improving the anti-cavitation effect or inhibiting cavitation of the water pump;

in a second operating condition, only the third regulation and control valve (36) is opened, and a high-pressure liquid in the pumping chamber of the volute (20) passes through the second pipeline (32) and the first through-hole (25) to be sprayed to the backflow hole (17) on the front disc (11), thereby adjusting flow, pressure, and backflow of a front disc side that are of the water pump, and improving the anti-cavitation effect or inhibiting cavitation of the water pump;

in a third operating condition, the first regulation and control valve (34) is opened, and the second regulation and control valve (35) or the third regulation and control valve (36) is opened, to realize two-way spraying of jet, thereby adjusting flow, pressure, inlet turbulence and backflow of the front disc side that are of the water pump, and improving the anti-cavitation effect or inhibiting cavitation of the water pump; and in a fourth operating condition, the first regulation and control valve (34) is opened, and the second regulation and control valve (35) and the third regulation and control valve (36) are both opened, to realize three-way supply and two-way spraying of jet, thereby adjusting flow, pressure, inlet turbulence and backflow of the front disc side that are of the water pump, and improving the anti-cavitation effect or inhibiting cavitation of the water pump; and step S3: the controller outputs an operating state of the water pump according to an adjusting result.

* * * * *